(12) United States Patent
Austrheim et al.

(10) Patent No.: US 12,060,042 B2
(45) Date of Patent: Aug. 13, 2024

(54) SERVICE VEHICLE WITH DRONE BASES

(71) Applicant: Autostore Technology AS, Nedre Vats (NO)

(72) Inventors: Trond Austrheim, Etne (NO); Jon Hermansen, Heggedal (NO)

(73) Assignee: AutoStore Technology AS, Nedre Vats (NO)

( * ) Notice: Subject to any disclaimer, the term of this patent is extended or adjusted under 35 U.S.C. 154(b) by 150 days.

(21) Appl. No.: 17/781,860

(22) PCT Filed: Dec. 1, 2020

(86) PCT No.: PCT/EP2020/083998
§ 371 (c)(1),
(2) Date: Jun. 2, 2022

(87) PCT Pub. No.: WO2021/110616
PCT Pub. Date: Jun. 10, 2021

(65) Prior Publication Data
US 2023/0014506 A1    Jan. 19, 2023

(30) Foreign Application Priority Data
Dec. 3, 2019   (NO) .................................. 20191426

(51) Int. Cl.
*B60S 5/00* (2006.01)
*B61B 5/02* (2006.01)
(Continued)

(52) U.S. Cl.
CPC ..................................... *B60S 5/00* (2013.01);
*B61B 5/02* (2013.01); *B61L 27/00* (2013.01);
*B62D 63/04* (2013.01);
(Continued)

(58) Field of Classification Search
CPC ... B60S 5/00; B61B 5/02; B61L 27/00; B62D 63/04; B61C 3/00; B65G 1/0464; B65G 1/0492; B65G 2207/40; G05D 1/02
See application file for complete search history.

(56) References Cited

U.S. PATENT DOCUMENTS 3,800,963 A     4/1974 Holland
2015/0066283 A1  3/2015 Wurman et al.

FOREIGN PATENT DOCUMENTS

CN      102695994 A    9/2012
CN      107466333 A    12/2017
(Continued)

OTHER PUBLICATIONS

International Search Report issued in PCT/EP2020/083998 on Feb. 23, 2021 (5 pages).
(Continued)

*Primary Examiner* — Michael D Lang
(74) *Attorney, Agent, or Firm* — Baker Botts L.L.P.

(57) ABSTRACT

A service vehicle provides a platform for servicing a container handling vehicle while on a grid-based rail system of a three-dimensional storage grid of an automated storage system for storing storage containers. The service vehicle includes two or more wheel modules. Each module having a first set of wheels configured to move the vehicle along a first lateral direction of the grid-based rail system and a second set of wheels configured to move the vehicle along a second lateral direction of the grid-based rail system. The second direction is perpendicular to the first direction. A platform is mounted on the two or more wheel modules. The platform includes an enclosure that has at least one opening that can be closed by a barrier. The platform has a set of tracks matching the width of the tracks on the grid.

24 Claims, 7 Drawing Sheets

(51) Int. Cl.
  *B61C 3/00* (2006.01)
  *B61L 27/00* (2022.01)
  *B62D 63/04* (2006.01)
  *B65G 1/04* (2006.01)
  *G05D 1/00* (2024.01)

(52) U.S. Cl.
  CPC .............. *B61C 3/00* (2013.01); *B65G 1/0464* (2013.01); *B65G 1/0492* (2013.01); *B65G 2207/40* (2013.01); *G05D 1/02* (2013.01)

(56) References Cited

FOREIGN PATENT DOCUMENTS

| CN | 207956780 U | 10/2018 |
| CN | 108778980 A | 11/2018 |
| CN | 109292343 A | 2/2019 |
| EP | 2020388 A1 | 2/2009 |
| JP | 2019-108204 A | 7/2019 |
| NO | 317366 B1 | 10/2004 |
| WO | 2014/090684 A1 | 6/2014 |
| WO | 2015/140216 A1 | 9/2015 |
| WO | 2015/193278 A1 | 12/2015 |
| WO | 2019/206672 A2 | 10/2019 |

OTHER PUBLICATIONS

Written Opinion of the International Searching Authority issued in PCT/EP2020/083998 on Feb. 23, 2021 (10 pages).

Norwegian Search Report issued in No. 20191426 mailed on Jul. 3, 2020 (2 pages).

Teng Yuhong, China National Intellectual Property Administration, Notification of the First Office Action with search report, pub. by CNIPA, Beijing, China, Apr. 25, 2024, 18 pages.

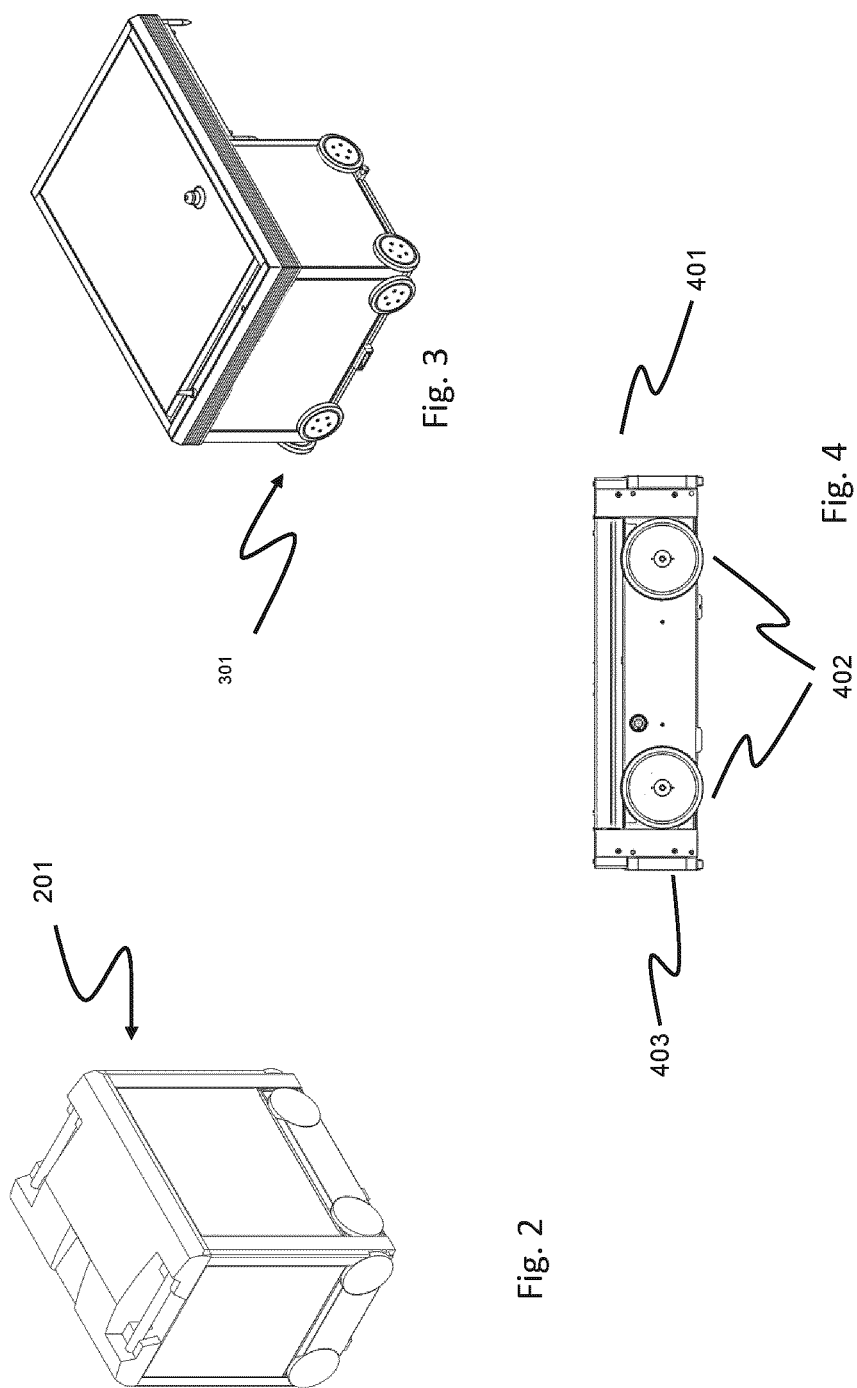

SERVICE VEHICLE WITH DRONE BASES

TECHNICAL FIELD

The present invention regards a system and method for servicing container handling vehicles on a grid-based rail system of a three-dimensional storage grid of an automated storage system and more particularly a service vehicle providing a platform for servicing a container handling vehicle on, while on a grid-based rail system of a three-dimensional storage grid of an automated storage system, and a method for operating such.

BACKGROUND AND PRIOR ART

FIG. 1 discloses a typical prior art automated storage and retrieval system 1 with a framework structure 100 and FIGS. 2 and 3 discloses two different prior art container handling vehicles 201, 301 suitable for operating on such a system 1.

The framework structure 100 comprises several upright members 102 and several horizontal members 103 which are supported by the upright members 102. The members 102, 103 may typically be made of metal, e.g. extruded aluminium profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

In the X and Y directions, neighbouring grid cells are arranged in contact with each other such that there is no space there-between.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. positioned with one or a plurality of other storage containers 106 positioned above the target storage container 106, the operation also involves temporarily moving the above-positioned storage containers 106 prior to lifting the target storage container 106 from the storage column 105. This step, which is sometimes referred to as "digging" within the art, may be performed with the same container handling vehicle that is subsequently used for transporting the target storage container 106 to the drop-off port 119, or with one or a plurality of other cooperating container handling vehicles. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers 106 positioned at or above the target position within the storage column stack 107 have been removed, the container handling vehicle 201, 301 positions the storage container 106 at the desired position. The removed storage containers 106 may then be lowered back into the storage column 105 or relocated to other storage columns.

FIG. 4 describes a wheel base of a delivery vehicle. The delivery vehicles comprise a base with the same setup of wheels as on the container handling vehicles. The wheel base unit features a wheel arrangement having a first set of wheels for movement in a first direction upon a rail grid (i.e. any of the top rail grid and the transfer rail grid) and a second set of wheels for movement in a second direction perpendicular to the first direction. Each set of wheels comprises two pairs of wheels arranged on opposite sides of the wheel base unit. To change the direction in which the wheel base unit may travel upon the rail grid, one of the sets of wheels is connected to a wheel displacement assembly. The wheel displacement assembly is able to lift and lower the connected set of wheels relative to the other set of wheels such that only the set of wheels travelling in a desired direction is in contact with the rail grid. The wheel displacement assembly is driven by an electric motor. Further, two electric motors, powered by a rechargeable battery, are connected to the set of wheels to move the wheel base unit in the desired direction. The horizontal periphery of the wheel base unit is dimensioned to fit within the horizontal area defined by a grid cell of the rail grid such that two-wheel base units may pass each other on any adjacent grid cells of the rail grid. In other words, the wheel base unit may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference.

A problem with present day solutions of automated storage and retrieval systems is if one of the container handling vehicles breaks down on the grid there is a problem with retrieving it. One used solution is a chair with wheels that an operator sits on and manoeuvres by hand out to the container handling vehicle that has broken down. Using this solution, the operator must transport the container handling vehicle that has broken down back to the service area using man power.

SUMMARY OF THE INVENTION

The present invention is set forth and characterized in the independent claims, while the dependent claims describe other characteristics of the invention.

A preferred embodiment of the present invention is defined by a service vehicle providing a platform for servicing a container handling vehicle, while on a grid-based rail system of a three-dimensional storage grid of an automated storage system for storing storage containers, wherein the service vehicle comprises two or more wheel modules, each module having a first set of wheels configured to move the vehicle along a first lateral direction (X) of the grid-based rail system and a second set of wheels configured to move the vehicle along a second lateral direction (Y) of the grid-based rail system, the second direction (Y) being perpendicular to the first direction (X), wherein a platform is mounted on the two or more wheel modules and said platform comprises an enclosure that has at least one opening that can be closed by a barrier.

Further the platform of the service vehicle is supported on at least two wheel modules. The wheel modules may be configured to work together as one master wheel module and one or more slave wheel modules.

The service vehicle may have a platform configured such that a container handling vehicle may be lifted onto the platform by hand, by an operator on the service vehicle. The service vehicle may have a bay that can hold a container handling vehicle while the service vehicle is on the grid. Further the platform of the service vehicle may be sized to accommodate at least one operator using a set of controls, wherein an operator on the service vehicle can control the movement of the service vehicle using the set of controls. Alternatively, or in in addition, the service vehicle may be controlled by a central control center.

The platform may be mounted to the upper surfaces of the wheel modules, for example, four wheel modules each positioned at a corner of the platform, and may comprise a bay for a container handling vehicle that is suspended between the wheel modules. The bay of the service vehicle may comprise part of the platform, for example, a part that is positioned, or can be positioned, lower than the remainder of the platform. The bay may be at a working level substantially corresponding to that of a base of the wheel modules. In this way a panel forming the bay may be positioned with a lower surface as close as possible to the upper surface of the rail system while still ensuring clearance and an upper surface which is only a few millimeters higher depending on the thickness of the panel. The bay may also be mounted to allow it to be lowered to rest on the rail system when it is position next to the container handling vehicle.

In other embodiments, the service vehicle may comprise a bay in the form of a recess provided in the platform that is sized to fit around the container handling vehicle. The recess may comprise a rectangular cut-out of a size corresponding to one or two grid cells.

The wheel modules of the service vehicle may be all of the same type. They may each have a perimeter which corresponds substantially to that of a grid cell of the underlying grid rail system. Each wheel module may comprise a rectangular body provided with eight wheels positioned in pairs on four sides of the body, all arranged within a perimeter of one grid cell. Wheels of one wheel module may be positioned so as to ride in a first track of a double track rail and pass, with a clearance, a wheel module in an adjacent grid cell that has wheels in a second track of the same double track rail. Each wheel module may be of a height which is only marginally taller than that of the wheels. For example, each wheel module may be of a height which is less than half that of the container handling vehicle it is intended to service.

The barrier may include an automated mechanism that prevents the barrier from being opened while the service vehicle is in motion.

The service vehicle may be provided with a communications device that can communicate with a communications device of a container handling vehicle and wherein the communications device of the container handling vehicle may be a wireless communications device. The service vehicle may have further a power connector configured to provide power to a container handling vehicle.

A further embodiment of the present invention may be configured in a system comprising a container handling vehicle and the service vehicle of any of the preceding statements, wherein the container handling vehicle may comprise a receiver and the service vehicle may comprise a transmitter. The container handling vehicle may be configured to receive remote control signals from the transmitter and to manoeuvre the container handling vehicle in response to those remote-control signals.

The service vehicle may be configured such that the platform that is mounted to the wheel modules can be turned 360° in either direction around a vertical axis and relative to the wheel modules. A slewing bearing may be placed between the service platform and the wheel modules and used to allow the service platform to rotate freely in either direction relative to the wheel modules. An electric motor may control the rotation of the platform.

Further the service vehicle may comprise a section of the platform with a height adjuster to lower the section onto rails of the grid. The height adjuster may be either a rack and pinion system or a set of hydraulic lifters. The platform may have a set of tracks matching the width of the tracks on the grid.

A method for servicing a container handling vehicle using a service vehicle in an automated storage system comprising a three-dimensional storage grid with a grid-based rail system for storing storage containers, the wherein the service vehicle comprises two or more wheel modules, each module having a first set of wheels configured to move the vehicle along a first lateral direction (X) of the grid-rail system, and a second set of wheels configured to move the vehicle along a second lateral direction (Y) of the grid-based rail system, the second direction (Y) being perpendicular to the first direction (X), the service vehicle comprising a platform mounted on the two or more wheel modules, the platform comprising an enclosure that has at least one opening that can be closed by a barrier, wherein said method comprises the steps of maneuvering the service vehicle along the grid to a location at which the opening of the enclosure is positioned next to the container handling vehicle, opening the barrier of the service vehicle, either manually lifting the container handling vehicle onto the platform or driving the container handling vehicle onto the platform of the service vehicle so that the container handling vehicle is received on the service vehicle and closing the barrier of the service vehicle.

BRIEF DESCRIPTION OF THE DRAWINGS

The following drawings are appended to facilitate the understanding of the invention. The drawings show embodiments of the invention, which will now be described by way of example only, where:

FIG. 2 is a perspective view of a prior art container handling vehicle having a centrally arranged cavity for containing storage containers therein.

FIG. 3 is a perspective view of a prior art container handling vehicle having a cantilever for containing storage containers underneath.

FIG. 4 is a perspective view of a prior art wheel module onto which different equipment can be mounted.

DETAILED DESCRIPTION

Figure 1:
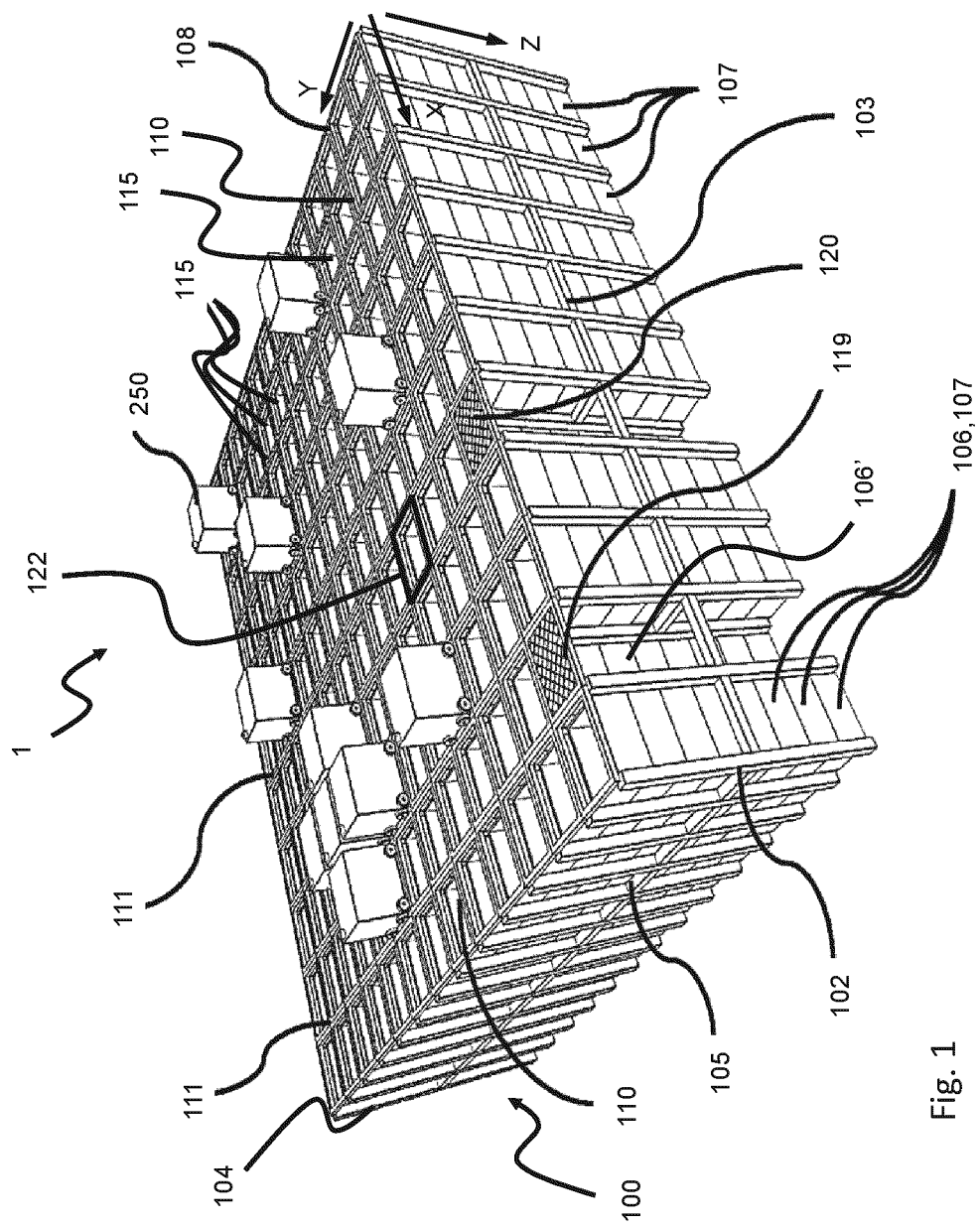
FIG. 1 is a perspective view of a prior art storage grid with container handling vehicles running on top.

In the following, the invention will be discussed in more detail with reference to the appended drawings. It should be understood, however, that the drawings are not intended to limit the invention to the subject-matter depicted.

A typical prior art automated storage and retrieval system 10 with a framework structure 100 was described in the background section above.

The container handling vehicle rail system 108 allows the container handling vehicles 201 to move horizontally between different grid locations, where each grid location is associated with a grid cell 122.

In FIG. 1, the storage grid 104 is shown with a height of eight grid cells 122. It is understood, however, that the storage grid 104 can in principle be of any size. The storage grid 104 can be considerably wider and/or longer than disclosed in FIG. 1. For example, the grid 104 may have a horizontal extent of more than 700×700 storage columns 105. Also, the grid 104 can be considerably deeper than disclosed in FIG. 1. For example, the storage grid 104 may be more than twelve grid cells 122 deep, i.e. in the Z direction indicated in FIG. 1.

FIG. 2 is a perspective view of a prior art container handling vehicle having a centrally arranged cavity for containing storage containers 106 therein.

The central cavity container handling vehicles 201 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference.

Alternatively, the central cavity container handling vehicles 101 may have a footprint which is larger than the lateral area defined by a grid column 112, e.g. as is disclosed in WO2014/090684A1.

FIG. 3 is a perspective view of a prior art container handling vehicle having a cantilever for containing storage containers 106 underneath.

FIG. 4 describes a wheel module 401. The wheel module 401 may be suitable for use as a base of a delivery vehicle, for delivering storage containers on a rail system of a storage grid.

The wheel module 401 may comprise the same setup of wheels as on the container handling vehicles. The wheel module 401 features a wheel arrangement having a first set of wheels 402 for movement in a first direction upon a rail grid (i.e. any of the top rail grid and the transfer rail grid) and a second set of wheels 403 for movement in a second direction perpendicular to the first direction. Each set of wheels comprises two pairs of wheels arranged on opposite sides of the wheel module 401. To change the direction in which the wheel module 401 may travel upon the rail grid, one of the sets of wheels is connected to a wheel displacement assembly. The wheel displacement assembly is able to lift and lower the connected set of wheels relative to the other set of wheels such that only the set of wheels travelling in a desired direction is in contact with the rail grid. The wheel displacement assembly is driven by an electric motor.

In the embodiment, two electric motors, powered by a rechargeable battery, are connected to the set of wheels to move the wheel module 401 in the desired direction.

The horizontal periphery of the wheel module 401 may be dimensioned to fit within the horizontal area defined by a grid cell of the rail grid such that two wheel modules 401 may pass each other on any adjacent grid cell of the rail grid. In other words, the wheel module 401 may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference. Each wheel of a set of wheels may be arranged to run along a track of a double-track rail that extends along an edge of a grid cell. The second track of the rail may allow a vehicle to pass in a neighboring grid cell with a clearance between the two vehicles.

Figure 5:
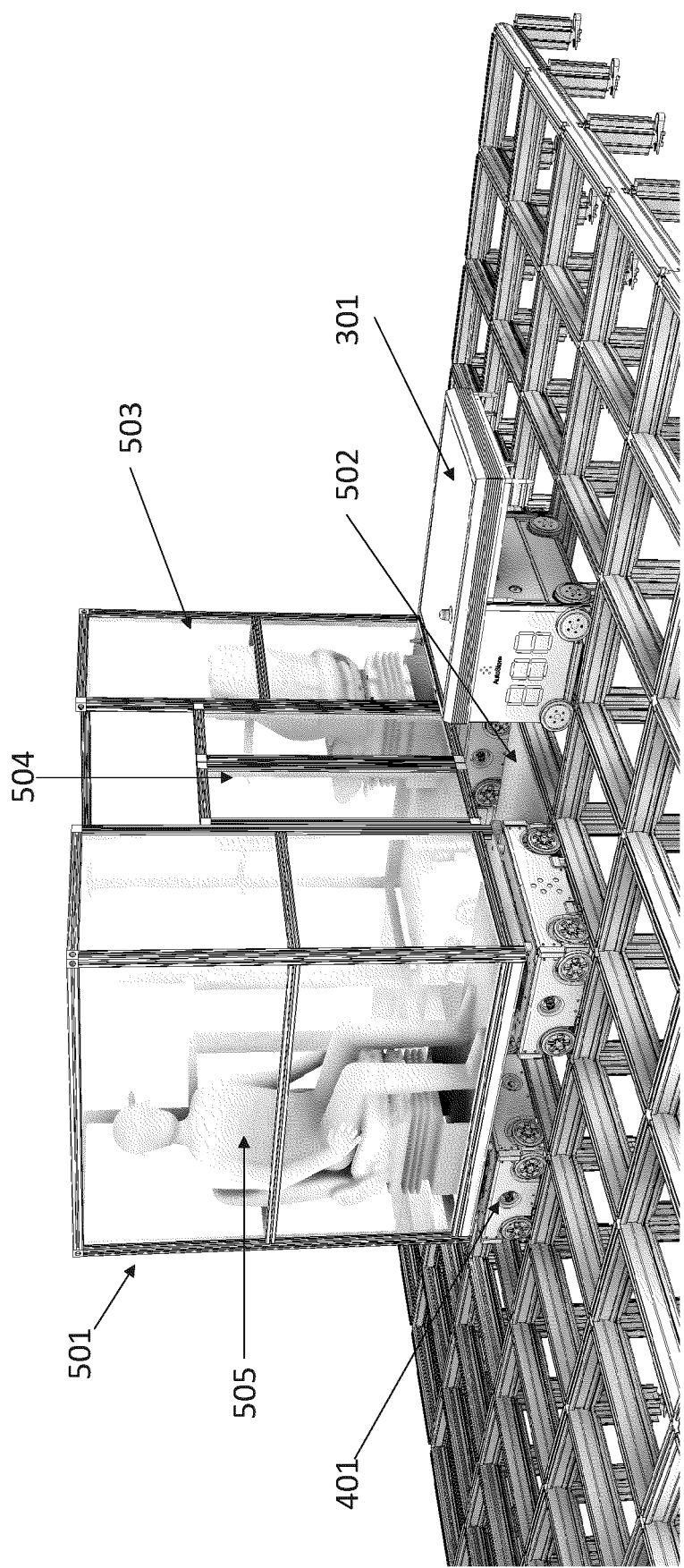
FIG. 5 is a perspective view of an exemplary service vehicle comprising a platform mounted on wheel modules placed on a grid with an operator on board maneuvering the service vehicle towards the broken-down container handling vehicle.

FIG. 5 is a perspective drawing of an exemplary service vehicle 501 on wheel modules 401 placed on a grid 104 with an operator 505 on board maneuvering the service vehicle 501 towards a container handling vehicle 201, 301. The service vehicle 501 comprises a platform 502 mounted on four wheel modules 401. An enclosure 503 surrounds the platform 502. This enclosure 503 comprises a framework of bars. Furthermore, the enclosure 503 is made of a transparent material like reinforced glass or plexiglass. The main purpose of the enclosure 503 is to protect the operator 505 on board the service platform 502. The enclosure 503 has at least one opening that allows access to a container handling vehicle. This opening has a closable barrier 504. The closable barrier 504 may comprise either one or more doors, e.g., either hinged doors or sliding doors. In yet another embodiment, the barrier 504 can be in the form of a drop door. This drop door can have rails or tracks on the inside matching the width and shape of the rails/tracks on the grid. These rails/tracks make it possible to roll the container handling vehicle onboard the service vehicle 501. The barrier, e.g., in the form of a door has an automatic locking mechanism that ensures that the door cannot be opened while the service vehicle 501 is in motion. A typical scenario of events is that the service vehicle 501 is maneuvered towards the container handling vehicle in question. If the doors are ordinary hinged doors or sliding doors, the doors are opened when the service vehicle 501 is positioned next to the container handling vehicle and the container handling vehicle is lifted onto the service vehicle 501. If the service vehicle 501 has a drop-down door, the door is dropped down onto the grid. The door is positioned such that the upper most edge of the door is next to the container handling vehicle when it is dropped down. The vehicle is then lifted onto the door and maneuvered, using hand power, on to the platform 502 of the service vehicle 501. The service can be performed while the service platform 502 is on the grid and the container handling vehicle is placed back on the grid. Alternatively, the container handling vehicle can be transported back to a service station for further repair.

The service platform 502 can communicate either wirelessly with the container handling vehicle, or the operator 505 can connect the service vehicle 501 directly to the container handling vehicle if it is not possible to communicate wirelessly. The operator 505 on the service vehicle 501 can then remote control the container handling vehicle.

Although it is described here that the platform 502 is mounted on four wheel modules 401, the number of modules can vary, there can be any number of modules from two and up. If two wheel modules are used the service platform and the wheel modules may take up 3 grid cells. If four wheel modules are used, the service platform and the wheel modules can take up anything from 4 grid cells and up and having either a square or rectangular size. Additional number of wheel modules can be used if a longer or wider service vehicle is used.

Figure 6:
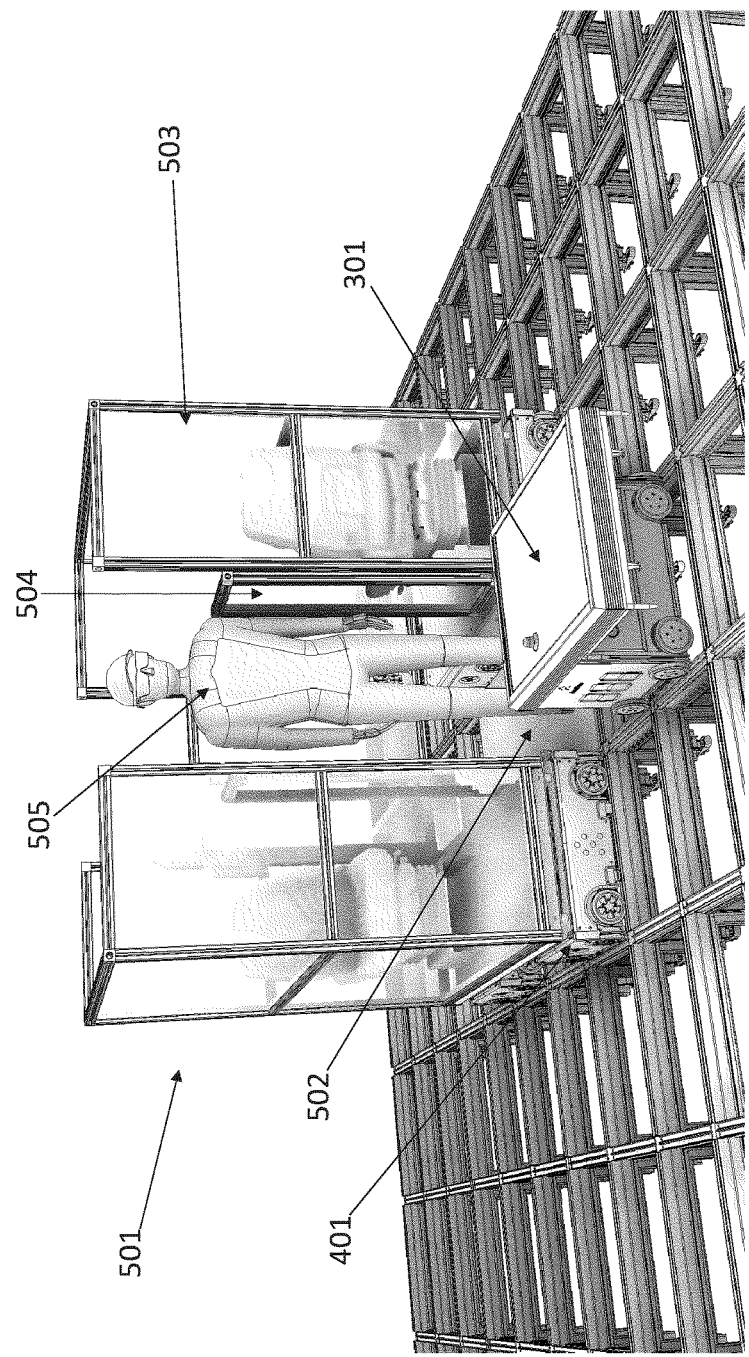
FIG. 6 is a perspective view of the service vehicle of FIG. 5 with the barrier open in order to gain access to the broken-down container handling vehicle.

FIG. 6 is a perspective view of the service vehicle 501 of FIG. 5 comprising a service platform 502 supported on wheel modules 401 with the barrier 504 open to gain access to the container handling vehicle. In this figure the service vehicle 501 has reached the container handling vehicle that has broken down. The operator 505 has opened the barrier 504 of the enclosure 503 to gain access to the container handling vehicle. The operator 505 can lift the container handling vehicle onboard the service platform 502 of the service vehicle 501. The operator 505 can either fix the container handling vehicle on the grid or he/she can transport it back to a service station. There is a benefit for fixing the container handling vehicle on the grid. The benefit is that the container handling vehicle can start operating where it stopped after it has been fixed.

Figure 7:
FIG. 7 is a perspective view of the service vehicle of FIG. 5 where the operator of the platform transfers the container handling robot on to the platform.

FIG. 7 is a perspective view of the service vehicle 501 of FIG. 5 comprising a service platform 502 on wheel modules 401 where the operator 505 of the platform 502 transfers the container handling robot onto the platform 502. The operator 505 can either lift the container handling vehicle onto the platform 502 or the operator 505 can connect to the container handling vehicle either wired or wirelessly and remotely control the container handling vehicle onto the platform 502.

Figure 8:
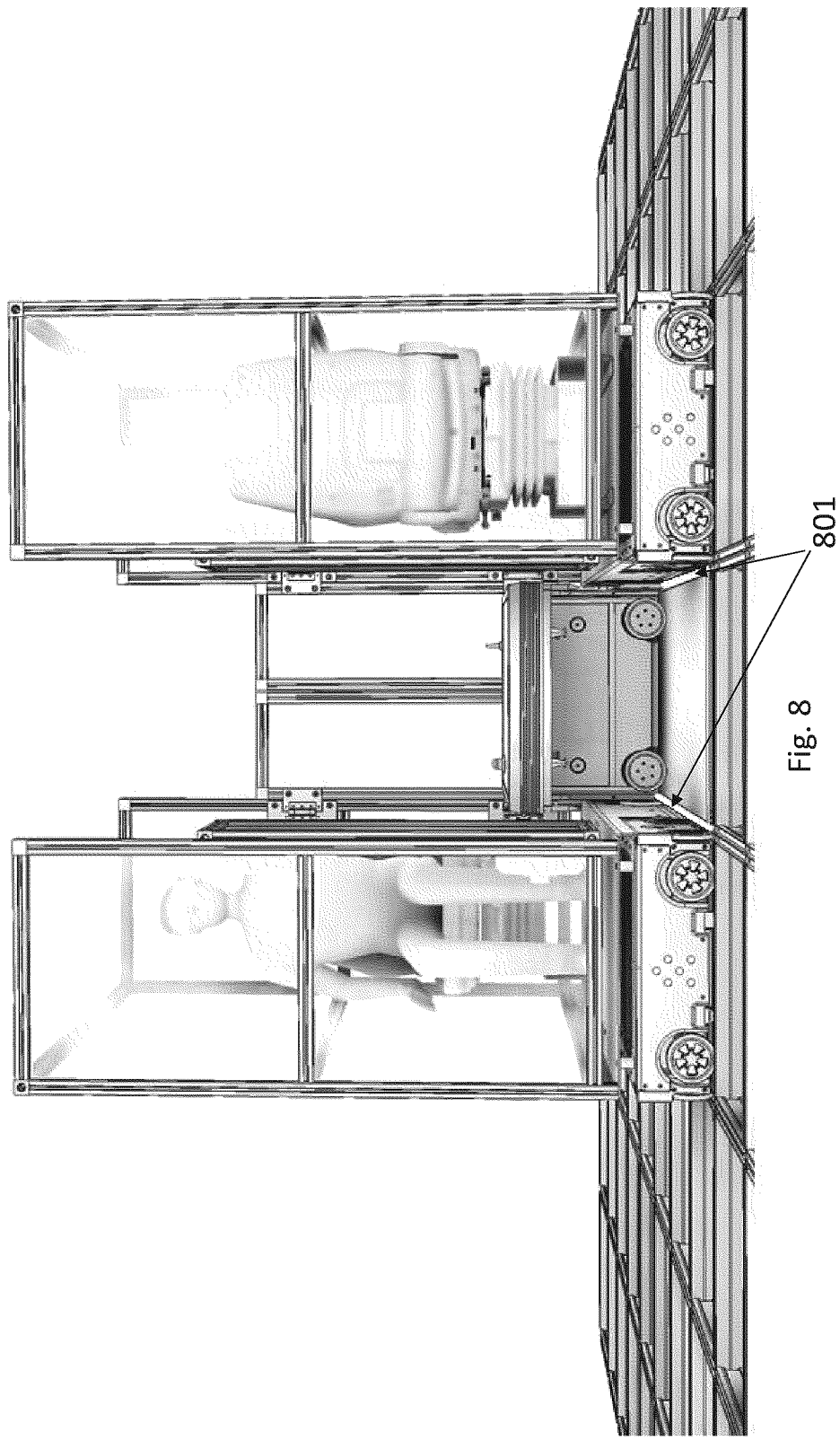
FIG. 8 is a perspective view of the service vehicle of FIG. 5 where the container handling vehicle is onboard the platform, and the platform is equipped with guiding rails to ease the access of the container handling vehicle onto the platform.

FIG. 8 is a perspective view of the service vehicle 501 of FIG. 5 where the container handling vehicle is onboard the platform 502. The platform 502 may be equipped with guiding tracks/rails 801 to ease the access of the container handling vehicle onto the platform 502. After the first set of wheels of the container handling vehicle has been lifted onto the track/rails in the platform 502, it can be pushed easily all the way in.

As it can be seen in this embodiment the service vehicle 501 comprises four wheel modules 401 for transporting the operator on the grid. To these wheel modules 401 there is mounted a platform 502. The platform 502 has two zones where the operator(s) 505 are situated, suitable for two operators. Between the two zones where the operators 505 are seated there is a space or bay for the container handling vehicle. The space or bay for the container handling vehicle is positioned lower down than the rest of the platform 502. This is in order to make it easier to get the container handling vehicle onto the platform 502. In a preferred embodiment of the present invention the space or bay for the container handling vehicle can be lowered in order to accommodate the container handling vehicle. During travel and when the operator 505 is working on the container handling vehicle the space for accommodating the container handling vehicle can be lifted. This allows the operator 505 greater access to the container handling vehicle when it is being worked on. Also, lifting the space for the container handling vehicle during travel makes it easier to maneuver the service vehicle 501 without the risk of the bottom of the platform hitting the top of the grid. The lifting and lowering of the platform 502 can be done, for example, by a rack and pinion system, hydraulics or electrical actuators.

Figure 9:
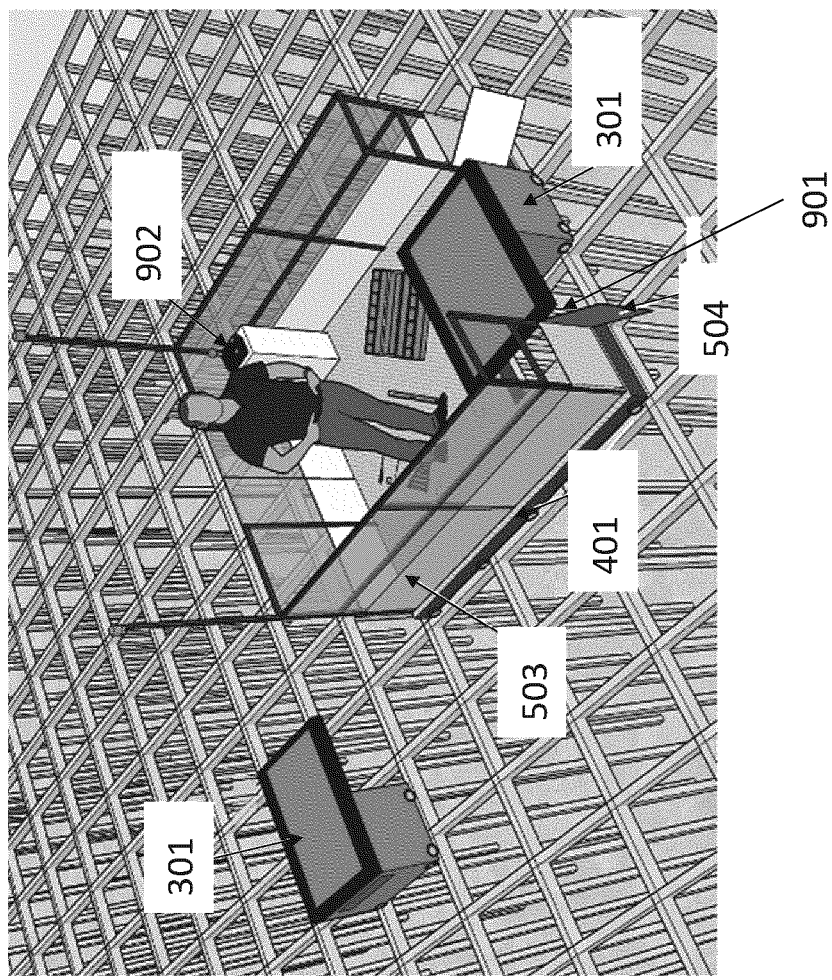
FIG. 9 is a perspective view of another exemplary service vehicle where the platform is placed on wheel modules, but the platform has a bay in the form of a recess into which the container handling vehicle fits.

FIG. 9 is a perspective view of another embodiment of the service vehicle where the platform 502 is placed on wheel modules 401 and has a bay 901 in the form of a recess into which the container handling vehicle fits. The bay 901 of the service vehicle 501 is of such a size that the container handling vehicle fits into the bay 901 with the barrier closed. The benefit of using a bay 901 in the form of a recess is that there is no lifting and movement of the container handling vehicle before repairing it, and the container handling vehicle can continue its operation from the exact same place it stopped. Further the bay 901 in the form of a recess is beneficial since it allows the operator 505 to safely repair the container handling vehicle while the rest of the grid is still operating.

In this embodiment, the platform 502 can be turned 360° in either direction around a vertical axis and relative to the wheel modules 401. The platform 502 can be turned relative to the wheel modules 401 using a slewing bearing mounted between the wheel modules 401 and the platform 502. The bearing can be turned by an electric motor. The electric motor turning the platform 502 relative to the wheel modules 401 can get its power from a set of rechargeable power sources mounted on the service vehicle 501.

The wheel modules 401 can be connected using a master and slave solution. In this context the master/slave configuration is used for load sharing purposes when two identical motors connected to two different drives are coupled to a common load. One drive is defined as the master and is configured for running in the speed-control mode whereas the other defined as slave is configured for running in torque-control mode.

LIST OF REFERENCE NUMBERS automated storage and retrieval system
100 framework structures
102 upright members
103 horizontal members
104 storage grid
105 storage columns
106 storage containers
106' storage containers
107 stacks
108 rail system
110 a first set of parallel rails
111 a second set of parallel rails
115 grid columns
119 port
120 port
122 grid cell
250 container handling vehicle
201 container handling vehicle
301 container handling vehicle
401 wheel module
402 Wheels for container handling vehicle
403 Wheels for container handling vehicle
501 service vehicle
502 platform on service vehicle
503 enclosure
504 barrier
505 operator
801 tracks on service vehicle platform
901 service vehicle bay
902 service vehicle controls

The invention claimed is:

1. A service vehicle providing a platform for servicing a container handling vehicle while on a grid-based rail system of a three-dimensional storage grid of an automated storage system for storing storage containers, wherein the service vehicle comprises two or more wheel modules, each module having a first set of wheels configured to move the service vehicle along a first lateral direction of the grid-based rail system and a second set of wheels configured to move the service vehicle along a second lateral direction of the grid-based rail system, the second lateral direction being perpendicular to the first lateral direction,
wherein the platform is mounted on the two or more wheel modules and said platform comprises an enclosure that has at least one opening that can be closed by a barrier, and
wherein the platform has a set of tracks matching a width of tracks on the grid.

2. A service vehicle according to claim 1, wherein the wheel modules are configured to work together as one master wheel module and one or more slave wheel modules.

3. A service vehicle according to claim 1, wherein the platform is configured such that the container handling vehicle may be lifted onto the platform by hand, by an operator on the service vehicle.

4. A service vehicle according to claim 1, wherein the service vehicle has a bay that can hold the container handling vehicle while the service vehicle is on the grid.

5. A service vehicle according to claim 1, wherein the platform of the service vehicle is supported on at least two wheel modules, optionally four wheel modules.

6. A service vehicle according to claim 1, wherein the platform 1 of the service vehicle is sized to accommodate at least one operator.

7. A service vehicle according to claim 1, further comprising a set of controls, wherein an operator on the service vehicle can control a movement of the service vehicle using the set of controls.

8. A service vehicle according to claim 1, wherein the service vehicle is controlled by a central control center.

9. A service vehicle according to claim 1, wherein the barrier includes an automated mechanism that prevents the barrier from being opened while the service vehicle is in motion.

10. A service vehicle according to claim 1, wherein the service vehicle is provided with a communications device that can communicate with a communications device of the container handling vehicle.

11. A service vehicle according to claim 10, wherein the communications device of the container handling vehicle is a wireless communications device.

12. A service vehicle according to claim 1, wherein the service vehicle has a power connector configured to provide power to the container handling vehicle.

13. A service vehicle according to claim 1, configured such that the platform is mounted to a wheel base and can be turned 360° in either direction around a vertical axis and relative to the wheel modules.

14. A service vehicle according to claim 13, wherein a stewing bearing is placed between the platform and the wheel modules and used to allow the platform to rotate freely in either direction relative to the wheel modules.

15. A service vehicle according to claim 13, wherein an electric motor controls a rotation of the platform in either direction around a vertical axis and relative to the wheel modules.

16. A service vehicle according to claim 1, wherein a section of the platform comprises a height adjuster to lower the section onto rails of the grid.

17. A service vehicle according to claim 16, wherein the height adjuster is either a rack and pinion system or a set of electronic actuators.

18. A system comprising a container handling vehicle and the service vehicle of claim 1, wherein the container handling vehicle comprises a receiver and the service vehicle comprises a transmitter, the container handling vehicle being configured to receive remote control signals from the transmitter and to maneuver the container handling vehicle in response to those remote-control signals.

19. A method for servicing a container handling vehicle using a service vehicle in an automated storage system comprising a three-dimensional storage grid with a grid-based rail system for storing storage containers, wherein the service vehicle comprises two or more wheel modules, each module having a first set of wheels configured to move the service vehicle along a first lateral direction of the grid-based rail system, and a second set of wheels configured to move the service vehicle along a second lateral direction of the grid-based rail system, the second lateral direction being perpendicular to the first lateral direction, the service vehicle comprising a platform mounted on the two or more wheel modules; the platform comprising an enclosure that has at least one opening that can be closed by a barrier, and the platform has a set of tracks matching a width of tracks on the grid, wherein said method comprises:

maneuvering the service vehicle along the grid to a location at which the at least one opening to the enclosure is positioned next to the container handling vehicle;

opening the barrier of the service vehicle;

either manually lifting the container handling vehicle onto the platform or driving the container handling vehicle onto the platform of the service vehicle so that the container handling vehicle is received on the service vehicle, closing the barrier of the service vehicle.

20. A method according to claim 19, wherein an operator situated on the service vehicle maneuvers the service vehicle.

21. A method according to claim 19, wherein a control center maneuvers the service vehicle.

22. A method according to claim 19, wherein the barrier cannot be opened while the service vehicle is in motion.

23. A method according to claim 19, wherein the container handling vehicle comprises a communications device that is a wireless communications device.

24. A method according to claim 19, wherein the container handling vehicle receives power from the service vehicle when the container handling vehicle is on the platform of the service vehicle.

\* \* \* \* \*